(12) United States Patent
Mori

(10) Patent No.: US 12,479,031 B2
(45) Date of Patent: Nov. 25, 2025

(54) COATED TOOL AND CUTTING TOOL

(71) Applicant: KYOCERA CORPORATION, Kyoto (JP)

(72) Inventor: Satoshi Mori, Satsumasendai (JP)

(73) Assignee: KYOCERA CORPORATION, Kyoto (JP)

( * ) Notice: Subject to any disclaimer, the term of this patent is extended or adjusted under 35 U.S.C. 154(b) by 504 days.

(21) Appl. No.: 17/914,358

(22) PCT Filed: Mar. 25, 2021

(86) PCT No.: PCT/JP2021/012712
§ 371 (c)(1),
(2) Date: Sep. 26, 2022

(87) PCT Pub. No.: WO2021/193867
PCT Pub. Date: Sep. 30, 2021

(65) Prior Publication Data
US 2023/0104832 A1    Apr. 6, 2023

(30) Foreign Application Priority Data
Mar. 27, 2020    (JP) .................................. 2020-059081

(51) Int. Cl.
*B23B 27/14*    (2006.01)
*C23C 28/04*    (2006.01)
*C23C 30/00*    (2006.01)

(52) U.S. Cl.
CPC .......... *B23B 27/148* (2013.01); *C23C 28/044* (2013.01); *C23C 30/00* (2013.01); *B23B 2228/105* (2013.01)

(58) Field of Classification Search
None
See application file for complete search history.

(56) References Cited

U.S. PATENT DOCUMENTS

| 8,021,757 B2 | 9/2011 | Wallgram et al. |
| 2011/0135897 A1* | 6/2011 | Layyous ................. C23C 30/00 427/249.17 |

FOREIGN PATENT DOCUMENTS

| CN | 102648305 A | 8/2012 |
| JP | H11335813 | * 12/1999 |
| JP | H11335813 A | 12/1999 |
| JP | 200118103 A | 1/2001 |
| JP | 5160231 B2 | 3/2013 |
| JP | 2013513027 A | 4/2013 |
| JP | 2019156692 A | 9/2019 |

* cited by examiner

*Primary Examiner* — Daniel J. Schleis
(74) *Attorney, Agent, or Firm* — HAUPTMAN HAM, LLP

(57) ABSTRACT

A coated tool according to the present disclosure comprises a base body and a coating film. The base body contains a plurality of boron nitride particles. The coating film is located on the base body. Furthermore, the coating film includes a hard layer and a metal layer other than a simple substance of Ti, Zr, V, Cr, Ta, Nb, Hf, and Al located between the base body and the hard layer.

15 Claims, 10 Drawing Sheets

| SAMPLE | | COATING FILM | | | | | | | | |
|---|---|---|---|---|---|---|---|---|---|---|
| | BASE BODY | METAL LAYER | | HARD LAYER | | | | | | |
| | | TYPE | THICKNESS (µm) | FIRST METAL NITRIDE LAYER | | SECOND METAL NITRIDE LAYER | | FIRST METAL NITRIDE LAYER + SECOND METAL NITRIDE LAYER | THIRD METAL NITRIDE LAYER | |
| | | | | TYPE | THICKNESS (nm) | TYPE | THICKNESS (nm) | THICKNESS (µm) | TYPE | THICKNESS (µm) |
| cBN WITHOUT METAL LAYER | cBN | — | — | TiAlNbWSiN | 50 | AlCrN | 50 | 0.5 | TiAlNbWSiN | 2 |
| cBN WITH METAL LAYER | cBN | Al$_{70}$Cr$_{30}$ | 0.2 | | | | | | | |

FIG. 6

| SAMPLE | MAXIMUM HARDNESS (GPa) | MAXIMUM HARDNESS LOAD (mN) | MAXIMUM HARDNESS DEPTH (nm) | MINIMUM HARDNESS (GPa) | MINIMUM HARDNESS LOAD (mN) | MINIMUM HARDNESS DEPTH (nm) | MAXIMUM HARDNESS DIFFERENCE (GPa) | AVERAGE HARDNESS (GPa) | DIFFERENCE BETWEEN AVERAGE HARDNESS AND MAXIMUM HARDNESS (GPa) | DIFFERENCE BETWEEN AVERAGE HARDNESS AND MINIMUM HARDNESS (GPa) |
|---|---|---|---|---|---|---|---|---|---|---|
| cBN WITHOUT METAL LAYER | 23 | 70 | 434.2 | 19.6 | 85 | 513.6 | 3.4 | 20.9 | 2.1 | 1.3 |
| cBN WITH METAL LAYER | 27.8 | 35 | 274.6 | 18.1 | 90 | 547.8 | 9.7 | 21.6 | 6.2 | 3.5 |

FIG. 7

| SAMPLE | PEEL LOAD (N) | PEEL TIME (min) |
|---|---|---|
| cBN WITHOUT METAL LAYER | 30 | 1 |
| cBN WITH METAL LAYER | 80> | 40> |

FIG. 8

| | PEAK INTENSITY I(111) | PEAK INTENSITY I(200) | ORIENTATION RATIO I(200)/I(111) |
|---|---|---|---|
| cBN WITH METAL LAYER | 507 | 3135 | 6.183432 |
| cBN WITHOUT METAL LAYER | 582 | 3007 | 5.166667 |

FIG. 10

COATED TOOL AND CUTTING TOOL

RELATED APPLICATIONS

The present application is a National Phase of International Application Number PCT/JP2021/012712 filed Mar. 25, 2021 and claims priority of Japanese Application Number 2020-059081 filed Mar. 27, 2020.

TECHNICAL FIELD

The present disclosure relates to a coated tool and a cutting tool.

BACKGROUND ART

As a tool used for cutting processing such as turning processing or milling processing, a coated tool is known in which a surface of a base body such as cemented carbide, cermet, or ceramic is coated with a coating film to improve wear resistance, etc. (see Patent Document 1).

CITATION LIST

Patent Literature

Patent Document 1: JP 5160231

SUMMARY OF INVENTION

According to one aspect of the present disclosure, a coated tool includes a base body and a coating film. The base body contains a plurality of boron nitride particles. The coating film is located on the base body. Furthermore, the coating film includes a hard layer and a metal layer other than a simple substance of Ti, Zr, V, Cr, Ta, Nb, Hf, and Al located between the base body and the hard layer.

BRIEF DESCRIPTION OF DRAWINGS

FIG. 6 is a table showing a composition of cBN without a metal layer and cBN with a metal layer.

FIG. 7 is a table showing results of an indentation hardness test on cBN without a metal layer and cBN with a metal layer.

FIG. 8 is a table showing results of a scratch test and a peel test for cBN without a metal layer and cBN with a metal layer.

FIG. 10 is a table showing X-ray intensities I(111) of the (111) plane, and I(200) of the (200) plane, and their orientation ratios (200)/I(111) in the graph shown in FIG. 9.

DESCRIPTION OF EMBODIMENTS

The following is a detailed description of a coated tool and a cutting tool according to the present disclosure (hereinafter referred to as "embodiments") with reference to the drawings. It should be noted that the coated tool and the cutting tool according to the present disclosure are not limited by the embodiments. In addition, embodiments can be appropriately combined so as not to contradict each other in terms of processing content. In the following embodiments, the same portions are denoted by the same reference signs, and overlapping explanations are omitted.

In the embodiments described below, expressions such as "constant", "orthogonal", "vertical", and "parallel" may be used, but these expressions do not need to be exactly "constant", "orthogonal", "vertical", and "parallel". In other words, each of the above-described expressions allows for deviations in, for example, manufacturing accuracy, positioning accuracy, and the like.

In the related art described above, there is room for further improvement in terms of improving the adhesion between the coating film and the base body.

The present disclosure has been made in light of the foregoing, and provides a coated tool and a cutting tool capable of improving the adhesion between the coating film and the base body.

Coated Tool

Figure 1:
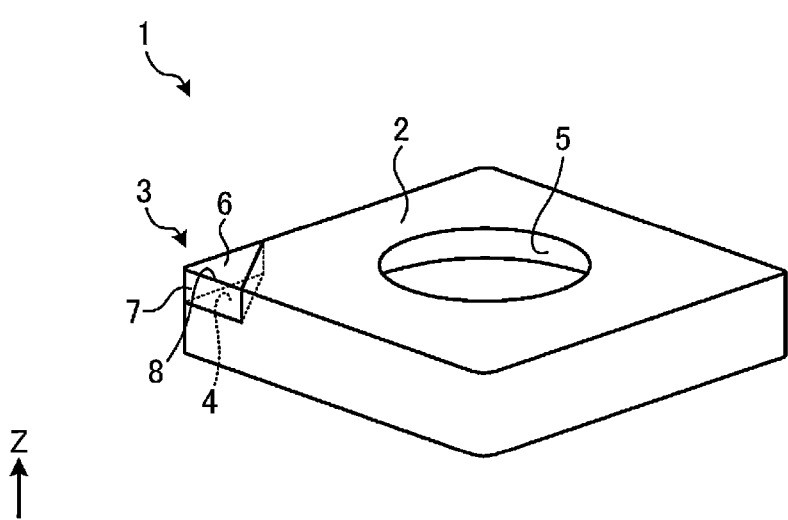
FIG. 1 is a perspective view illustrating an example of a coated tool according to an embodiment.

FIG. 1 is a perspective view illustrating an example of a coated tool according to an embodiment. As illustrated in FIG. 1, a coated tool 1 according to the embodiment includes a tip body 2 and a cutting edge portion 3. In the embodiment, the coated tool 1 has a hexagonal shape in which a shape of an upper surface and a lower surface (a surface intersecting the Z-axis illustrated in FIG. 1) is a parallelogram.

Tip Body 2

The tip body 2 is formed of, for example, cemented carbide. The cemented carbide contains tungsten (W), specifically, tungsten carbide (WC). Further, the cemented carbide may contain nickel (Ni) or cobalt (Co). The tip body 2 may be formed of a cermet. The cermet contains, for example, titanium (Ti), specifically, titanium carbide (TiC) or titanium nitride (TiN). Furthermore, the cermet may contain Ni or Co.

A seat 4 for attaching the cutting edge portion 3 is located in a corner portion of the tip body 2. In addition, a through hole 5 that vertically penetrates the tip body 2 is located in the center portion of the tip body 2. A screw 75 for attaching the coated tool 1 to a holder 70 described later is inserted into the through hole 5 (see FIG. 5).

Cutting Edge Portion 3

The cutting edge portion 3 is integrated with the tip body 2 by being attached to the seat 4 of the tip body 2.

The cutting edge portion 3 has a first surface 6 (here, an upper surface) and a second surface 7 (here, a side surface) that is connected to the first surface 6. In the embodiment, the first surface 6 functions as a "rake face" for scooping chips generated by cutting, and the second surface 7 functions as a "flank face". A cutting edge 8 is located on at least a part of a ridge line where the first surface 6 and the second surface 7 intersect with each other, and the coated tool 1 cuts a work material through application of the cutting edge 8 against the work material.

Figure 2:
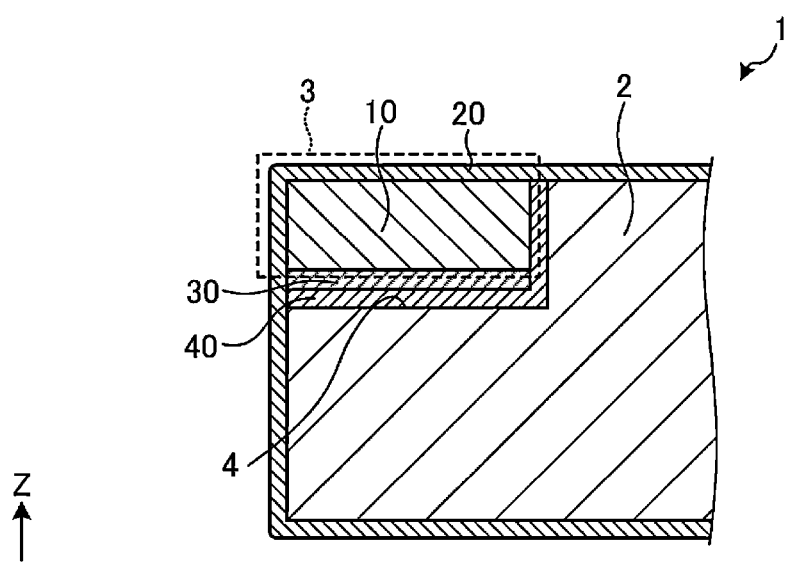
FIG. 2 is a side sectional view illustrating an example of the coated tool according to the embodiment.

The configuration of the cutting edge portion 3 will be described with reference to FIG. 2. FIG. 2 is a side sectional view illustrating an example of the coated tool 1 according to the embodiment. As illustrated in FIG. 2, the cutting edge portion 3 has a base body 10 and a coating film 20.

Base Body 10

The base body 10 contains a plurality of boron nitride particles. In the embodiment, the base body 10 is a cubic boron nitride (cBN) sintered compact and contains a plurality of cubic boron nitride particles. In the embodiment, the base body 10 may have a binder phase containing TiN, Al, $Al_2O_3$, etc. between the plurality of boron nitride particles. The plurality of boron nitride particles are strongly bonded by such a binder phase. Note that the base body 10 does not necessarily have a binder phase.

A substrate 30 made from, for example, cemented carbide or cermet may be located on the lower surface of the base body 10. In this case, the base body 10 is bonded to the seat 4 of the tip body 2 via the substrate 30 and a bonding material 40. The bonding material 40 is, for example, a brazing material. In a portion other than the seat 4 of the tip body 2, the base body 10 may be bonded to the tip body 2 via the bonding material 40.

Coating Film 20

The base body 10 is coated with the coating film 20 for the purpose of, for example, improving wear resistance, heat resistance, etc. of the cutting edge portion 3. In the example in FIG. 2, the coating film 20 entirely covers the tip body 2 and the cutting edge portion 3. The coating film 20 may be located at least on the base body 10. The coating film 20 may be located on the tip body 2. When the coating film 20 is located on the upper surface of the base body 10 corresponding to the first surface 6 of the cutting edge portion 3, the wear resistance and heat resistance of the first surface 6 are high. When the coating film 20 is located on the side surface of the base body 10 corresponding to the second surface 7 of the cutting edge portion 3, the wear resistance and heat resistance of the second surface 7 are high.

Figure 3:
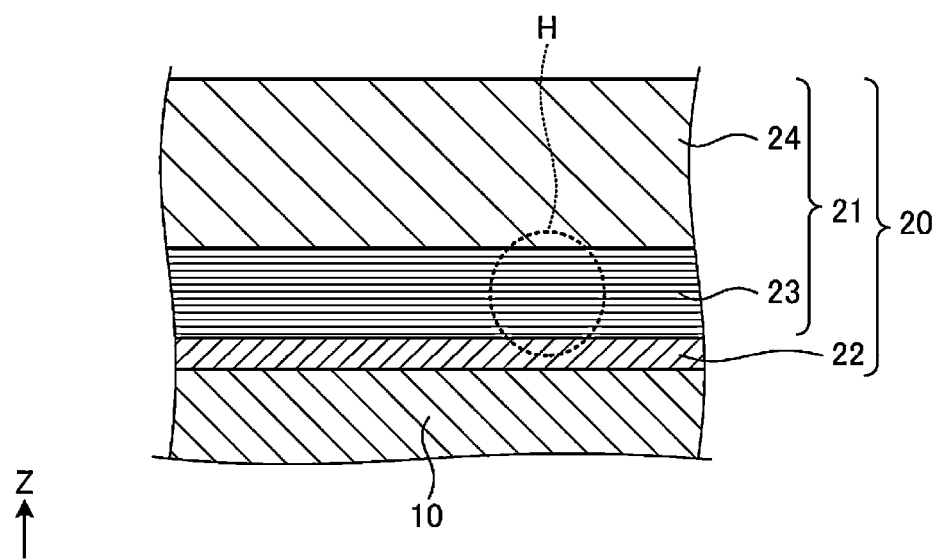
FIG. 3 is a cross-sectional view illustrating an example of the coating film according to the embodiment.

Here, a specific configuration of the coating film 20 will be described with reference to FIG. 3. FIG. 3 is a cross-sectional view illustrating an example of the coating film 20 according to the embodiment.

As illustrated in FIG. 3, the coating film 20 has a hard layer 21. The hard layer 21 is a layer having excellent wear resistance compared with a metal layer 22 described below. The hard layer 21 has one or more metal nitride layers. The hard layer 21 may be one layer. Additionally, as illustrated in FIG. 3, a plurality of metal nitride layers may be overlapped. Additionally, the hard layer 21 may include a laminate portion 23 in which a plurality of metal nitride layers are layered, and a third metal nitride layer 24 located above the laminate portion 23. The configuration of the hard layer 21 will be described later.

Metal Layer 22

Further, the coating film 20 includes the metal layer 22. The metal layer 22 is located between the base body 10 and the hard layer 21. Specifically, the metal layer 22 has one surface (here, a lower surface) in contact with the upper surface of the base body 10 and another surface (here, an upper surface) in contact with the lower surface of the hard layer 21.

The metal layer 22 has a higher adhesion to the base body 10 than to the hard layer 21. Examples of metal elements having such characteristics include Zr, V, Cr, W, Al, Si, and Y. The metal layer 22 contains at least one metal element among the above-described metal elements.

Note that a simple substance of Ti, a simple substance of Zr, a simple substance of V, a simple substance of Cr, and a simple substance of Al are not used as the metal layer 22. These are not suitable for use in cutting tools because all of these materials have a low melting point and low oxidation resistance. In addition, a simple substance of Hf, a simple substance of Nb, a simple substance of Ta, and a simple substance of Mo have low adhesion to the base body 10. However, this does not apply to alloys containing Ti, Zr, V, Cr, Ta, Nb, Hf, and Al.

The metal layer 22 may be an Al—Cr alloy layer containing an Al—Cr alloy. Since the metal layer 22 has particularly high adhesion to the base body 10, the effect of improving the adhesion between the base body 10 and the coating film 20 is high.

When the metal layer 22 is an Al—Cr alloy layer, the Al content in the metal layer 22 may be greater than the content of Cr in the metal layer 22. For example, the composition ratio (atomic %) of Al and Cr in the metal layer 22 may be 70:30. With such a composition ratio, the adhesion between the base body 10 and the metal layer 22 is higher.

The metal layer 22 may contain components other than the metal elements (Zr, V, Cr, W, Al, Si, Y). However, from the perspective of adhesion to the base body 10, the metal layer 22 may contain at least 95 atomic % or more of the metal elements in a combined amount. More preferably, the metal layer 22 may contain 98 atomic % or more of the metal elements in a combined amount. For example, in a case where the metal layer 22 is an Al—Cr alloy layer, the metal layer 22 may contain at least 95 atomic % or more of Al and Cr in a combined amount. Furthermore, the metal layer 22 may contain at least 98 atomic % or more of Al and Cr in a combined amount. Note that the proportion of the metal components in the metal layer 22 can be identified by, for example, analysis using an energy dispersive X-ray spectrometer (EDS).

In addition, since Ti has poor wettability with the base body 10 according to the embodiment, it is preferable that the metal layer 22 does not contain Ti as much as possible from the viewpoint of improving adhesion with the base body 10. Specifically, the Ti content in the metal layer 22 may be 15 atomic % or less.

As described above, in the coated tool 1 according to the embodiment, by providing the metal layer 22 having higher wettability with the base body 10 than the hard layer 21 between the base body 10 and the hard layer 21, it is possible to improve the adhesion between the base body 10 and the coating film 20. Since the metal layer 22 has high adhesion to the hard layer 21, the hard layer 21 is less likely to peel off from the metal layer 22.

Also, the cBN used as the base body 10 is an insulator, and there is room for improvement in adhesion with a film formed by a physical vapor deposition method (PVD). In contrast, in the coated tool 1 according to the embodiment, the metal layer 22 having electrical conductivity is provided on the surface of the base body 10, and thus the adhesion between the hard layer 21 formed by PVD and the metal layer 22 is high.

Hard Layer 21

Figure 4:
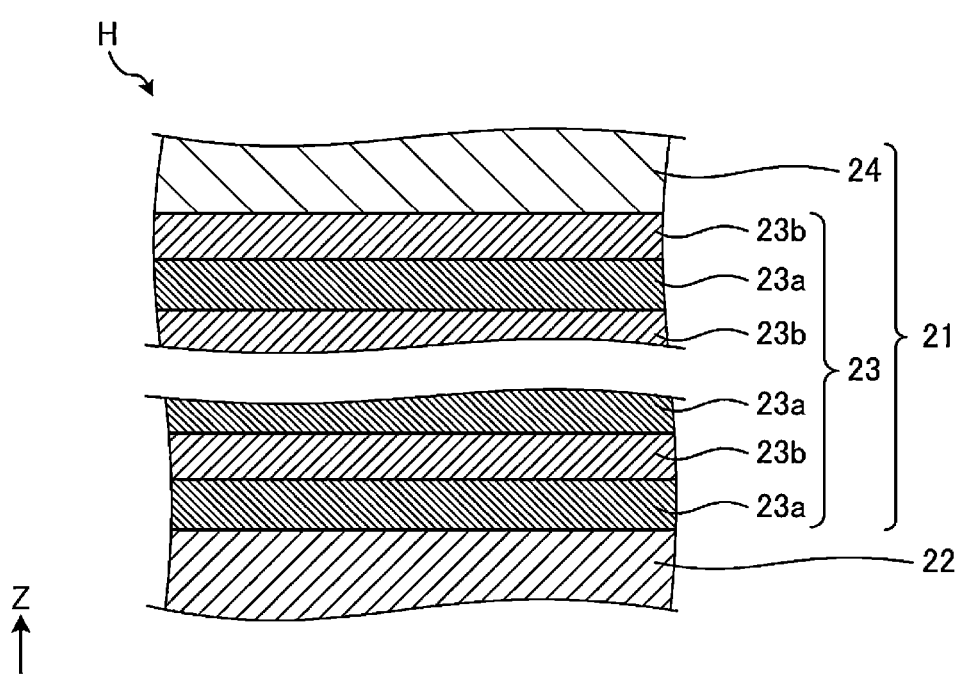
FIG. 4 is a schematic enlarged view of a portion H illustrated in FIG. 3.

Next, the configuration of the hard layer 21 will be described with reference to FIG. 4. FIG. 4 is a schematic enlarged view of a portion H illustrated in FIG. 3.

As illustrated in FIG. 4, the hard layer 21 has the laminate portion 23 located on the metal layer 22 and the third metal nitride layer 24 located on the laminate portion 23.

The laminate portion 23 includes a plurality of first metal nitride layers 23a and a plurality of second metal nitride layers 23b. The laminate portion 23 has a configuration in which the first metal nitride layers 23a and the second metal nitride layers 23b are alternately layered.

The thickness of the first metal nitride layer 23a and the second metal nitride layer 23b may be 50 nm or less. In this way, by forming the first metal nitride layer 23a and the second metal nitride layer 23b thin, the residual stress of the first metal nitride layer 23a and the second metal nitride layer 23b is small. As a result, for example, peeling and cracking of the first metal nitride layer 23a and the second metal nitride layer 23b are less likely to occur, so that the durability of the coating film 20 is high.

The first metal nitride layer 23a is a layer that contacts the metal layer 22, and the second metal nitride layer 23b is formed on the first metal nitride layer 23a.

The first metal nitride layer 23a and the second metal nitride layer 23b may contain a metal contained in the metal layer 22.

For example, it is assumed that two kinds of metals (here, "first metal" and "second metal") are included in the metal layer 22. In this case, the first metal nitride layer 23a contains a nitride of the first metal and the third metal. The third metal is a metal not included in the metal layer 22. The second metal nitride layer 23b contains a nitride of the first metal and the second metal.

For example, in the embodiment, the metal layer 22 may contain Al and Cr. In this case, the first metal nitride layer 23a may contain Al. Specifically, the first metal nitride layer 23a may be an AlTiN layer containing AlTiN, which is a nitride of Al and Ti. The second metal nitride layer 23b may be an AlCrN layer containing AlCrN, which is a nitride of Al and Cr.

In this way, the first metal nitride layer 23a containing the metal contained in the metal layer 22 is located on the metal layer 22, and thus the adhesion between the metal layer 22 and the hard layer 21 is high. This makes it difficult for the hard layer 21 to peel off from the metal layer 22, so the durability of the coating film 20 is high.

The first metal nitride layer 23a, that is, the AlTiN layer is excellent in terms of, for example, wear resistance in addition to adhesion to the metal layer 22 described above. The second metal nitride layer 23b, that is, the AlCrN layer, has excellent heat resistance and oxidation resistance, for example. In this manner, the coating film 20 includes the first metal nitride layer 23a and the second metal nitride layer 23b having different compositions from each other, and thus properties such as wear resistance and heat resistance of the hard layer 21 can be controlled. Accordingly, the tool life of the coated tool 1 can be extended. For example, in the hard layer 21 according to the embodiment, mechanical properties such as adhesion with the metal layer 22 and wear resistance can be improved while maintaining excellent heat resistance of AlCrN.

Note that the laminate portion 23 may be formed by, for example, an arc ion plating method (AIP method). The AIP method is a method in which target metals (here, an AlTi target and an AlCr target) are evaporated by using an arc discharge in a vacuum atmosphere, and are combined with $N_2$ gas to form metallic nitrides (here, AlTiN and AlCrN). Note that the metal layer 22 may also be formed by the AIP method.

The third metal nitride layer 24 may be located on the laminate portion 23. Specifically, the third metal nitride layer 24 is in contact with the second metal nitride layer 23b of the laminate portion 23. The third metal nitride layer 24 is, for example, a metal nitride layer (AlTiN layer) containing Ti and Al similar to the first metal nitride layer 23a.

The thickness of the third metal nitride layer 24 may be greater than each thickness of the first metal nitride layer 23a and the second metal nitride layer 23b. Specifically, as described above, when the thickness of the first metal nitride layer 23a and the second metal nitride layer 23b is 50 nm or less, the thickness of the third metal nitride layer 24 may be 1 μm or more. For example, the thickness of the third metal nitride layer 24 may be 1.2 μm.

As a result, for example, when the coefficient of friction of the third metal nitride layer 24 is low, the welding resistance of the coated tool 1 can be improved. In addition, for example, when the hardness of the third metal nitride layer 24 is high, the wear resistance of the coated tool 1 can be improved. In addition, for example, when the oxidation start temperature of the third metal nitride layer 24 is high, the oxidation resistance of the coated tool 1 can be improved.

The thickness of the third metal nitride layer 24 may be greater than the thickness of the laminate portion 23. Specifically, in the embodiment, when the thickness of the laminate portion 23 is 0.5 μm or less, the thickness of the third metal nitride layer 24 may be 1 μm or more. For example, when the thickness of the laminate portion 23 is 0.3 μm, the thickness of the third metal nitride layer 24 may be 1.2 μm. In this way, the third metal nitride layer 24 is thicker than the laminate portion 23, and thus the effect of improving the welding resistance, wear resistance, etc. described above is further enhanced.

The thickness of the metal layer 22 may be, for example, 0.1 μm or more and less than 0.6 μm. That is, the metal layer 22 may be thicker than each of the first metal nitride layer 23a and the second metal nitride layer 23b, and may be thinner than the laminate portion 23.

Cutting Tool

Figure 5:
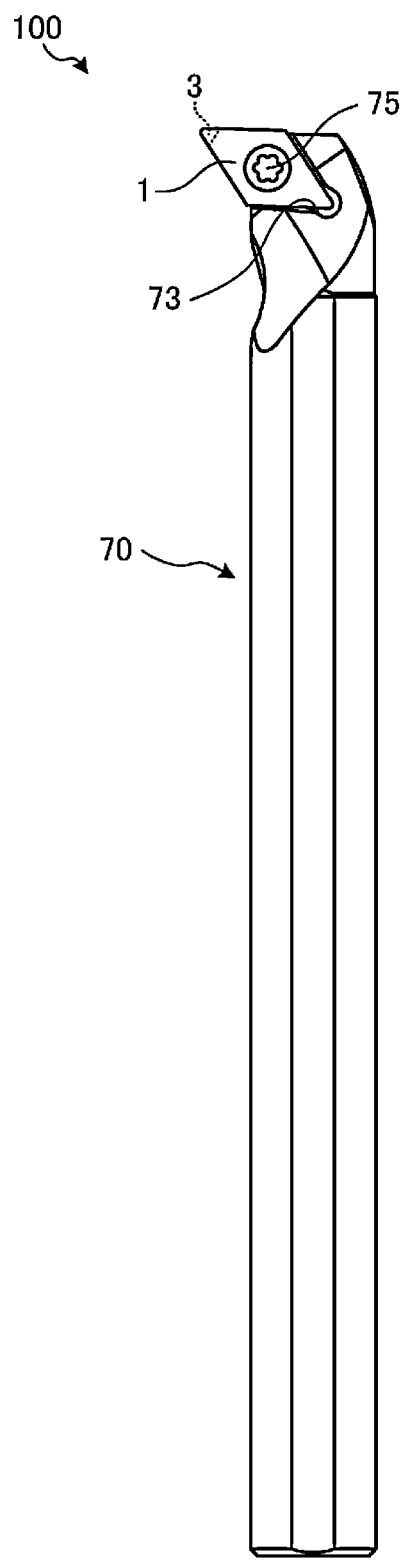
FIG. 5 is a front view illustrating an example of a cutting tool according to the embodiment.

Next, a configuration of a cutting tool including the above-described coated tool 1 will be described with reference to FIG. 5. FIG. 5 is a front view illustrating an example of a cutting tool according to the embodiment.

As illustrated in FIG. 5, the cutting tool 100 according to the embodiment includes the coated tool 1 and a holder 70 for fixing the coated tool 1.

The holder 70 is a rod-shaped member that extends from a first end (an upper end in FIG. 5) toward a second end (a lower end in FIG. 5). The holder 70 is made of, for example, steel or cast iron. In particular, it is preferable to use steel having high toughness among these members.

The holder 70 has a pocket 73 at an end portion on the first end side. The pocket 73 is a portion in which the coated tool 1 is mounted, and has a seating surface intersecting with the rotation direction of the work material and a restraint side surface inclined with respect to the seating surface. A screw hole into which a screw 75 described later is screwed is provided on the seating surface.

The coated tool 1 is located in the pocket 73 of the holder 70, and is mounted on the holder 70 by the screw 75. That is, the screw 75 is inserted into the through hole 5 of the coated tool 1, and the tip end of the screw 75 is inserted into the screw hole formed in the seating surface of the pocket 73, and the screw portions are screwed together. Thus, the coated tool 1 is mounted on the holder 70 such that the cutting edge 8 (see FIG. 1) protrudes outward from the holder 70.

In the embodiment, a cutting tool used for so-called turning processing is exemplified. As the turning processing, for example, boring, outer diameter processing, and groove-forming are cited. Note that, a cutting tool is not limited to those used in the turning processing. For example, the coated tool 1 may be used as a cutting tool used for milling processing.

For example, the cutting processing of the work material includes the steps of (1) rotating a work material, (2) bringing the cutting edge 8 of the coated tool 1 into contact with the rotating work material to cut the work material, and (3) separating the coated tool 1 from the work material. Here, representative examples of the material of the work material include carbon steel, alloy steel, stainless steel, cast iron, non-ferrous metals, etc.

Example 1: Scratch Test and Peel Test

The inventors of the present application performed a scratch test and a peel test on a sample in which a coating film was formed on cBN. FIG. 6 is a table showing configurations of cBN without a metal layer and cBN with a metal layer. Also, FIG. 7 is a table showing results of an indentation hardness test on cBN without a metal layer and cBN with a metal layer.

A metal layer having the composition shown in the table in FIG. 6 was provided on the surface of the cBN sintered compact in a tool shape. Furthermore, the hard layer in the table in FIG. 6 was provided on the metal layer (cBN with a metal layer). In addition, the hard layer in the table in FIG. 6 was provided directly on the cBN sintered compact as a Comparative Example (cBN without a metal layer). Note that the cBN sintered compact has a binder.

The scratch test and peel test were performed for these samples. The scratch test was evaluated by the magnitude of the peel load, and the larger the peel load, the more difficult the peeling. In addition, the longer the peel time, the less likely it is for peeling to occur.

The scratch test was performed using a diamond indenter having a tip shape with a curvature radius R of 200 μm at a rate of 10 mm/min and a load rate of 100 N per minute.

The peel test was performed on a hardened SCM415 work piece using a tool-shaped sample of CNGA120408S01225 under the processing conditions of cutting speed: 150 m/min, feed rate: 0.1 mm/rotation, and depth of cut: 0.2 mm, and the time until the hard layer peeled off was evaluated.

The peel load and peel time are shown in FIG. 8. FIG. 8 is a table showing results of a scratch test and a peel test for cBN without a metal layer and cBN with a metal layer. As shown in FIG. 8, in cBN with a metal layer, the peel load was larger than that of cBN without a metal layer, and the peel time was significantly longer. In FIG. 8, "80>" indicates that the peel load is less than 80 N but close to 80 N (at least 75 N or more). Similarly, in FIG. 8, "40>" indicates that the peel time is less than 40 minutes but close to 40 minutes (at least 35 minutes or more). Thus, in cBN with a metal layer, peeling of the coating film is less likely to occur compared with cBN without a metal layer, that is, the durability of the coating film is high.

The indentation hardness test shown in FIG. 7 was performed using a microindentation hardness tester "ENT-1100b/a" (manufactured by Elionix Inc.).

Prior to measurement of hardness, the thickness of the coating film was measured in the cross section of the base body orthogonal to the surface of the base body. The coating film had a thickness of 2.7 μm when the metal layer was included. The coating film had a thickness of 2.5 μm when the metal layer was not included. The indenter was pushed in from the surface of the coating film by 20% of the thickness of the coating film. The indentation of the indenter into the surface of the coating film was increased by approximately 0.02 μm. This indentation depth can be made deep by increasing the indentation load. Increasing the indentation depth by 0.02 μm is equivalent to increasing the indentation load by about 5 mN.

In this test, when the indenter is pushed in to a depth of 20% of the thickness of the coating film, the hardness from the surface of the coating film to the vicinity of the surface of the base body can be measured. In the present disclosure, as described above, the hardness of the coating film refers to the hardness obtained by pressing an indenter from the surface of the coating film to a depth of 20% of the coating film while changing the indentation load of the indenter. In the indentation hardness test, with deeper indentation depth, it is possible to measure the hardness of a deeper region from the surface of the coating film.

Example 2: XRD Measurement

Figure 9:
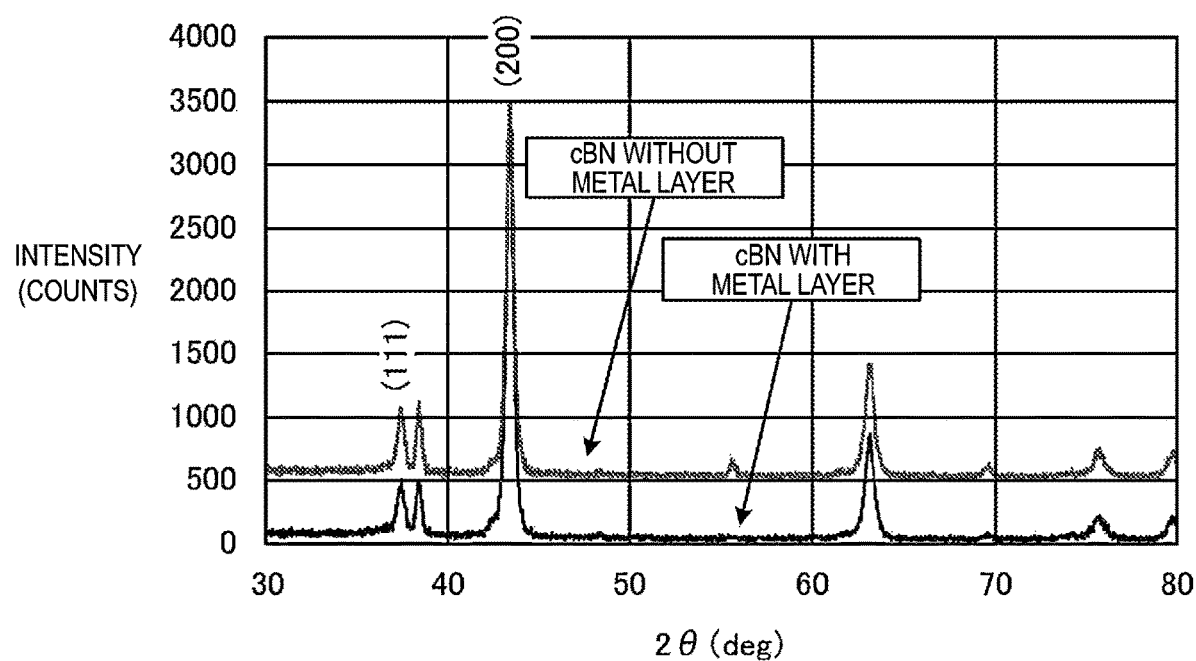
FIG. 9 is a graph showing results of XRD measurement of cBN without a metal layer and cBN with a metal layer.

The inventors of the present application performed XRD measurement of a sample in which a coating film was formed on cBN. The results are shown in FIGS. 9 and 10. FIG. 9 is a graph showing results of the XRD measurement of cBN without a metal layer and cBN with a metal layer. Also, FIG. 10 is a table showing the X-ray intensities I(111) of the (111) plane, I(200) of the (200) plane, and their orientation ratios I(200)/I(111) in the graph shown in FIG. 9.

This test was carried out using a thin film X-ray diffractometer "X'Pert PRO-MRD (DY2295)" (manufactured by PANalytical). The optical system of the apparatus is an X-ray mirror and a flat plate collimator. Also, the X-ray tube of the device is CuKα, and the output is 45 kV/40 mA.

The measurement conditions of the test are as follows.
Measurement method: 2θ scan
Measurement range: 20° to 80°
Angle of incidence: 0.5°
Step: 0.02°
Time: 4.0 sec/step
The samples are of the following two types.
(1) A coating film with a metal layer formed on cBN (cBN with a metal layer)
(2) A coating film without a metal layer formed on cBN (cBN without a metal layer)

FIG. 9 shows the results of XRD measurement of cBN with a metal layer and cBN without a metal layer. For ease of viewing, in FIG. 9, the X-ray intensity of the measurement result of the cBN without a metal layer is shifted to the high intensity side by 500 on the whole.

In FIG. 9, the diffraction peak having a peak in the range of from 36° to 38° corresponds to the (111) plane of the cubic crystal of the metal nitride contained in the coating film. Also, the diffraction peak having a peak in the range of from 42° to 44° corresponds to the (200) plane of the same cubic crystal.

As shown in FIG. 10, in cBN with a metal layer, the X-ray intensity I(111) of the (111) plane was 507, the X-ray intensity I(200) of the (200) plane was 3135, and the orientation ratio I(200)/I(111) thereof was 6.183432. On the other hand, in cBN without a metal layer, the X-ray intensity I(111) of the (111) plane was 582, the X-ray intensity I(200) of the (200) plane was 3007, and the orientation ratio I(200)/I(111) thereof was 5.166667.

By providing the metal layer on the coating film in this way, it is possible to obtain a coated tool having an orientation ratio I(200)/I(111) of 5.3 or more. The coated tool having such a configuration has a high hardness of the hard layer and has excellent wear resistance.

Additionally, the residual stress of the hard layer based on the (311) plane of the cubic crystal in the cBN with a metal layer is smaller than 0 MPa, and is greater than −1150 MPa. The coated tool having such a configuration has excellent impact resistance and is less likely to peel off the hard layer.

Variation

In the above-described embodiment, the coated tool 1 in which the base body 10 made of boron nitride particles, etc. is attached to the tip body 2 made of cemented carbide, etc. and these are coated with the coating film 20 has been described. Without being limited thereto, the coated tool according to the present disclosure may be, for example, a coated tool in which all of the base body having a hexahedral shape in which the shapes of the upper surface and the lower surface are parallelograms is a cubic boron nitride sintered compact, and a coating film is formed on the base body.

In the embodiment described above, the shape of the upper surface and the lower surface of the coated tool 1 is a parallelogram, but the shape of the upper surface and the lower surface of the coated tool 1 may be diamond or square. Additionally, the shape of the upper surface and the lower surface of the coated tool 1 may be triangular, pentagonal, hexagonal, etc.

The shape of the coated tool 1 may be of a positive type or negative type. The positive type is a type in which the side surface is inclined with respect to the central axis passing through the center of the upper surface and the center of the lower surface of the coated tool 1, and the negative type is a type in which the side surface is parallel to the central axis.

In the embodiment described above, an example is described in which the base body 10 contains cubic boron nitride (cBN) particles. Although not limited thereto, the base body disclosed in the present application may contain particles such as hexagonal boron nitride (hBN), rhombohedral boron nitride (rBN), wurtzite boron nitride (wBN), etc.

In the embodiment described above, the coated tool 1 has been described as being used for cutting processing, but the coated tool according to the present application can also be applied to a tool other than a cutting tool, such as a tool or a cutting edge for digging.

Further effects and modification examples can be readily derived by those skilled in the art. Thus, a wide variety of aspects of the present invention are not limited to the specific details and representative embodiments represented and described above. Accordingly, various changes are possible without departing from the spirit or scope of the general inventive concepts defined by the appended claims and their equivalents.

DESCRIPTION OF THE REFERENCE NUMERAL

1 Coated tool
2 Tip body
3 Cutting edge portion
4 Seat
5 Through hole
6 First surface
7 Second surface
8 Cutting edge
10 Base body
20 Coating film
21 Hard layer
22 Metal layer
23 Laminate portion
23a First metal nitride layer
23b Second metal nitride layer
24 Third metal nitride layer
30 Substrate
40 Bonding material
70 Holder
73 Pocket
75 Screw
100 Cutting tool

The invention claimed is:
1. A coated tool comprising:
a base body containing a plurality of boron nitride particles; and
a coating film located on the base body, wherein
the coating film comprises:
a hard layer; and
a metal layer comprising an alloy containing at least one selected from the group consisting of elements of Zr, Hf, V, Nb, Ta, Cr, Mo, W, Al and Y, the metal layer being located between the base body and the hard layer, wherein
the hard layer comprises:
a laminate portion comprising a plurality of first metal nitride layers having a first composition and a plurality of second metal nitride layers having a second composition different from the first composition, wherein first metal nitride layers of the plurality of first metal nitride layers have an alternating arrangement with second metal nitride layers of the plurality of second metal nitride layers; and
a third metal nitride layer, wherein the laminate portion is between the base body and the third metal nitride layer, wherein the third metal nitride layer is an outermost layer of at least a portion of the hard layer, and a thickness of the third metal nitride layer is greater than a thickness of an entirety of the laminate portion.

2. The coated tool according to claim 1, wherein the metal layer contains 95 atomic % or more of the element.

3. The coated tool according to claim 1, wherein the metal layer contains Al and Cr in a combined amount of 95 atomic % or more.

4. The coated tool according to claim 1, wherein a Ti content in the metal layer is 15 atomic % or less.

5. The coated tool according to claim 1, wherein the base body comprises a binder phase between the boron nitride particles.

6. The coated tool according to claim 1, wherein the metal nitride layer in contact with the metal layer contains a metal contained in the metal layer.

7. The coated tool according to claim 1, wherein a thickness of each of the first metal nitride layer and the second metal nitride layer is 50 nm or less.

8. The coated tool of claim 1, wherein
the metal layer contains a first metal and a second metal,
the first metal nitride layer contains a nitride of the first metal and a third metal, and
the second metal nitride layer contains a nitride of the first metal and the second metal.

9. The coated tool according to claim 8, wherein
the first metal nitride layer contains Ti and Al,
the second metal nitride layer contains Al and Cr, and
the third metal nitrdie layer contains Ti and Al.

10. The coated tool according to claim 1, wherein
the hard layer contains a cubic crystal, and
when an X-ray intensity of a (200) plane in the cubic crystal is defined as I(200), and an X-ray intensity of a (111) plane in the cubic crystal is defined as I(111), the I(200)/the I(111) is 5.3 or more.

11. A cutting tool comprising:
a rod-shaped holder comprising a pocket at an end portion thereof; and
the coated tool according to claim 1 located in the pocket.

12. The coated tool according to claim 1, wherein
a thickness of the first metal nitride layer and the second metal nitride layer is 50 nm or less, and
the thickness of the third metal nitride layer is 1 μm or more.

13. The coated tool according to claim 12, wherein
the thickness of the laminate portion is 0.5 μm or less.

14. The coated tool according to claim 1, wherein
a thickness of the metal layer is greater than a thickness of each of the first metal nitride layer and the second metal nitride layer.

15. The coated tool according to claim 14, wherein
the thickness of the laminate portion is greater than the thickness of the metal layer.

* * * * *